United States Patent [19]

Tenner et al.

[11] 4,115,515
[45] Sep. 19, 1978

[54] METHOD FOR REDUCING $NO_x$ EMISSION TO THE ATMOSPHERE

[75] Inventors: Arthur R. Tenner, Morris Plains; David W. Turner, South Brunswick, both of N.J.

[73] Assignee: Exxon Research and Engineering Company, Linden, N.J.

[21] Appl. No.: 802,868

[22] Filed: Jun. 2, 1977

Related U.S. Application Data

[63] Continuation of Ser. No. 678,656, Apr. 20, 1976, abandoned.

[51] Int. Cl.² ............................................. C01B 21/00
[52] U.S. Cl. .................................... 423/235; 423/351
[58] Field of Search ............... 423/235, 351; 110/1 R, 110/1 J

[56] References Cited

U.S. PATENT DOCUMENTS

| | | | |
|---|---|---|---|
| 3,846,981 | 11/1974 | Paczkowski | 423/235 |
| 3,900,554 | 8/1975 | Lyon | 423/235 |

FOREIGN PATENT DOCUMENTS

| | | | |
|---|---|---|---|
| 577,486 | 6/1969 | Canada | 110/1 J |
| 895,484 | 5/1962 | United Kingdom | 110/1 J |
| 1,388,669 | 3/1975 | United Kingdom | 423/235 |

OTHER PUBLICATIONS

Perry's Chemical Engineers' Handbook, 4th ed. 1967, pp. 9-39 to 9-41 and 21-24.

*Primary Examiner*—O. R. Vertiz
*Assistant Examiner*—Eugene T. Wheelock
*Attorney, Agent, or Firm*—Jerome E. Luecke

[57] ABSTRACT

An improved method and apparatus for reducing $NO_x$ emissions to the atmosphere from stationary combustion sources. The improvement is accomplished by providing a plurality of zones and/or stages for injecting a suitable reducing gas and then injecting the reducing gas through one or more of said zones. The particular zone or zones actually used will be determined by temperature of the combustion effluent gas in the immediate vicinity thereof. Similarly, the exact composition of the reducing gas employed will be determined by the same temperature.

4 Claims, 11 Drawing Figures

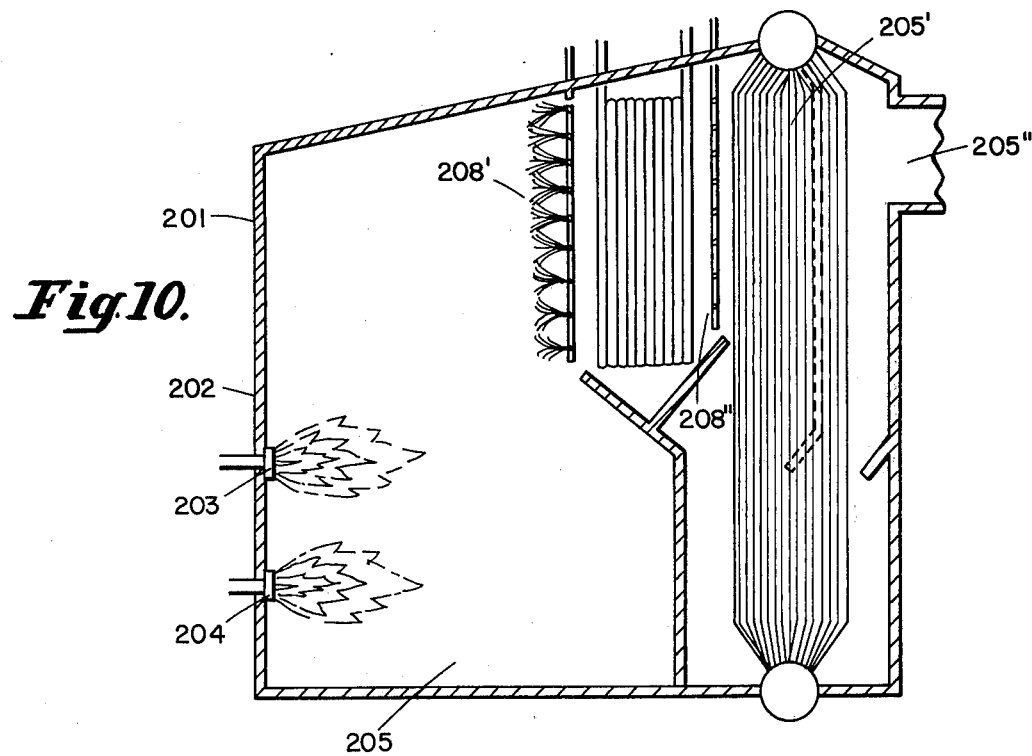

METHOD FOR REDUCING $NO_x$ EMISSION TO THE ATMOSPHERE

This application is a continuation of copending application Ser. No. 678,656, filed Apr. 20, 1976, now abandoned.

BACKGROUND OF THE INVENTION

This invention relates to a method and apparatus for reducing the emission of nitrogen oxide to the atmosphere from stationary sources. More particularly, this invention relates to a method and apparatus for effecting such a reduction wherein a suitable reducing agent is employed without the aid of an extraneous catalyst.

As is well known, various oxides of nitrogen are produced during the combustion of most fuels with air. In general, these oxides result either from the oxidation of nitrogen in the air at the elevated temperatures of combustion or from the oxidation of nitrogen contained in the fuel. Such formation can, of course, occur in both catalytic and non-catalytic combustion although the formation is much more predominant in non-catalytic combustion. Various oxides of nitrogen are also produced in chemical processes such as in the production of nitric acid.

Generally, these oxides have been emitted to the atmosphere with the effluent gases from such combustion operations and chemical processes. As is also well known, certain of these oxides and particularly nitrogen dioxide cause deleterious effects in human, plant and other animal life. Moreover, certain of these oxides have been identified as reactants in photochemical smog formation. The continued emission of these oxides to the atmosphere, then, poses a threat to the health and welfare of the community and to the plant and animal life therein. As a result, considerable effort has been made recently to either significantly reduce and/or eliminate such emissions to the atmosphere both from internal combustion engines as well as stationary sources such as power plants, process furnaces, incinerators and the like — all as a part of a program to improve and/or protect the environment.

As a part of this effort, several processes have heretofore been proposed for reducing the emission of such oxides to the atmosphere. These include various combustion modifications such as operations with low excess air, two-stage combustion wherein first stage combustion is accomplished with substoichiometric air, partial and complete catalytic combustion, combustion in the presence of various $NO_x$ inhibitors and catalytic and non-catalytic treatment of combustion effluent so as to effect either partial or complete reduction of the nitrogen oxides which might otherwise be emitted to the atmosphere. Each of these processes has, of course, met with some degree of success and, indeed, any one could be an optimum procedure for a particular application depending upon such factors as the total quantity of $NO_x$ involved, the degree of reduction sought, and the nature of the combustion or chemical process involved. For the reduction of $NO_x$ emissions from stationary combustion sources such as furnaces and boilers, however, the catalytic and non-catalytic treatment of the combustion effluent appear to offer the greatest advantages. Moreover, economic considerations presently appear to favor the use of a non-catalytic treatment such as that disclosed in U.S. Pat. No. 3,900,554 granted Aug. 19, 1975, provided at least that the desired degree of $NO_x$ reduction can be achieved therewith at all furnace and/or boiler loadings. In this regard, it should be noted that due to the critical and relatively narrow temperature range over which effective $NO_x$ reduction can be accomplished, some difficulty has been encountered in effectively applying this process in all furnace and boiler operations, independent of the particular furnace or boiler type, and at all furnace and boiler loadings. Also, due to the relatively high temperature at which the ammonia is added some difficulty has been encountered in effecting and controlling the injection of the ammonia into the combustion effluent gas stream without some undesirable dissociation of the ammonia. In light of these deficiencies, the need for an improved process which would permit the use of a non-catalytic effluent treatment in any furnace and/or boiler and the realization of the advantages associated therewith is believed to be readily apparent.

SUMMARY OF THE INVENTION

In accordance with the present invention, the foregoing and other disadvantages of the prior art non-catalytic effluent treatment processes are avoided and an improved process permitting broad, general use in furnaces and boilers provided thereby. Accordingly, it is an object of the present invention to provide an improved non-catalytic process for the reduction of nitrogen oxide emission to the atmosphere. It is another object of the present invention to provide such a process wherein the reducing agent is effectively distributed in the effluent stream subjected to treatment. It is still another object of this invention to provide such a process wherein the reducing agent can be injected within the desired optimum temperature range at all or substantially all furnace and/or boiler loadings. It is yet another object of the present invention to provide such a process wherein the reducing agent can be distributed in the effluent gas stream without any significant, undesirable dissociation of the same. These and other objects and advantages will become apparent from the description set forth hereinafter and the drawings attached thereto.

In accordance with the present invention, the foregoing and other objects and advantages are accomplished by providing means for injecting a suitable reducing agent or agents into the combustion gas effluent stream at different locations. Generally, the means actually used for injection will be determined by the temperature within the immediate area of said injection means or an operating parameter which would reflect this temperature. Generally, the injection means will consist of a plurality of apertures and/or nozzles sized and positioned so as to provide adequate mixing and hence contacting between the reducing agent or agents and the oxides of nitrogen to be reduced therewith. Also, each of the multiple point injection means will be suitably insulated and/or cooled so as to prevent dissociation of the reducing agent prior to injection into the effluent gas stream and to prevent temperature variation within said means.

BRIEF DESCRIPTION OF THE DRAWINGS

FIG. 10 is a cross-sectional view of a boiler identical to that illustrated in FIGS. 2, 3 and 9 showing an alternate location for the plurality of injection means.

DETAILED DESCRIPTION

Figure 1:
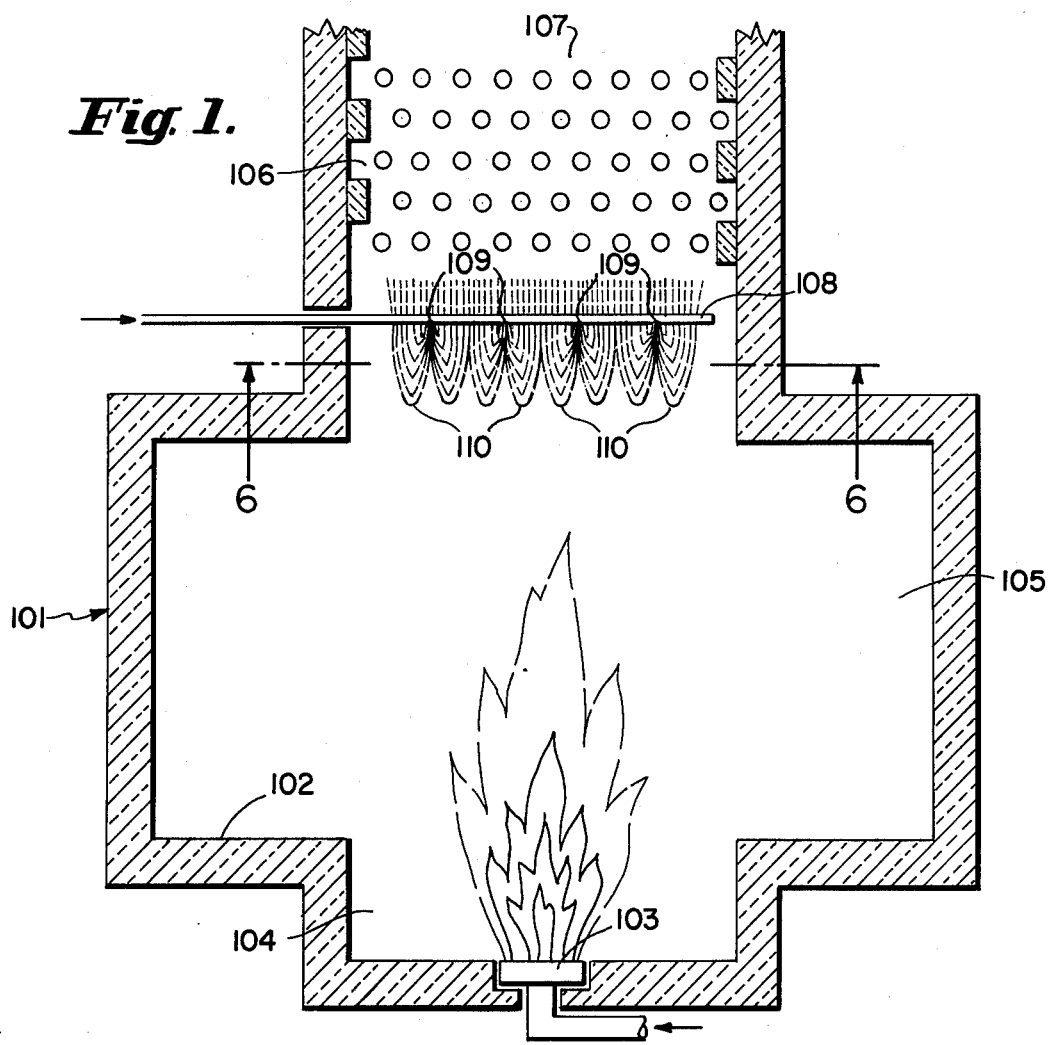
FIG. 1 is a cross-sectional view of a process furnace, with certain detail omitted for purposes of clarity, illustrating the modifications required to achieve the injection flexibility sought in the present invention.

As indicated previously, the present invention relates to an improved method for reducing nitrogen oxide emission to the atmosphere from a stationary combustion source such as a furnace, boiler, incinerator or the like wherein a suitable reducing agent or combination thereof is injected into the combustion effluent within a critical temperature range and the nitrogen oxide reduction effected thermally or without a catalyst. More particularly, the present invention relates to an improved process for effecting such a reduction wherein ammonia either alone or in combination with another reducing agent is used in a manner substantially described in U.S. Pat. No. 3,900,554, the disclosure of which is hereby incorporated by reference. Still more particularly, the present invention comprises the steps of: (1) combusting a suitable fuel in a stationary combustion apparatus, such as a furnace, boiler, incinerator or the like, which is equipped with a plurality of reducing agent injection stages and/or zones; and (2) injecting a reducing agent or a combination thereof into the effluent gas stream through one or more of said injection stages and/or zones such that the desired contacting and reduction is accomplished within the time and space provided. As indicated more fully hereinafter, the reducing agent injection stages and/or zones will be disposed in the firebox portion of the combustion apparatus, the convection section thereof or one or more stages and/or zones may be disposed in each of these sections.

As indicated in the aforementioned U.S. Pat. No. 3,900,554, ammonia is the principal reducing agent useful in the invention there claimed and is, accordingly, the principal reducing agent useful in the present invention. The ammonia, can, however, be derived from a suitable precursor and such derivation is within the scope of the present invention. As also indicated in the aforementioned U.S. Patent, ammonia is effective, when used alone, at any temperature within the range from about 1600° to about 2000° F. and the same is most effective within the narrower range from about 1700° to about 1900° F. The effective temperature range can, however, be extended to a temperature within the range from about 1300° to 2000° F. through the use of one or more additional reducing materials such as the paraffinic, olefinic and aromatic hydrocarbons, oxygenated hydrocarbons, nitrogenated hydrocarbons, sulfonated hydrocarbons, carbon monoxide and hydrogen. As indicated in the referenced patent, however, hydrogen is most preferred since it is not itself an air pollutant and since it does not yield an air pollutant by incomplete oxidation. Moreover, and notwithstanding this broader disclosure, ammonia will, generally, be used most effectively alone in the method of the present invention at temperatures within the range from about 900° to about 1000° C. and in combination with another reducing material at temperatures within the range from about 700° to about 900° C.

As is well known, combustion is effected in stationary combustion equipment such as that with which the present invention is concerned in a section of the apparatus commonly referred to as a firebox. Generally, this is accomplished by igniting a suitable fuel, in the presence of air, with one or more burners. Materials other than conventional fuels can, however, be combusted in the firebox portions of the apparatus and this is generally the case when combustion is effected in an incinerator. In any event, the principal combustion products are carbon dioxide and steam and these products, along with the other combustion products such as carbon monoxide and the various oxides of nitrogen and sulfur, combine with any excess oxygen and unconverted nitrogen to form what is referred to throughout this specification as a combustion effluent.

The temperature of the combustion effluent is, then, a maximum at or near the point of combustion and the same decreases axially (along the flow path) and radially (outwardly) as the effluent moves along its flow path from the point of combustion until it is, ultimately, emitted to the atmosphere or otherwise loses its identity as a combustion effluent. In this regard, it will be appreciated that the maximum change in temperature will occur along that portion of the flow path in which the effluent is contacted with heat exchange equipment as occurs in the convection section of such equipment. Moreover, the temperature in any given combustion facility will also vary with operating conditions such as the particular fuel burned, the amount of such fuel burned, the number of burners used to effect the burning (at least when less than the total number available are used) and the rate of cooling effected with the energy recovery method actually used.

As a result of these variations in temperature, as well as variations in flow rate across the effluent flow path it is not, generally, possible to achieve a maximum reduction in $NO_x$ emissions to the atmosphere, at all possible modes of operation for a given combustion facility, with a single reducing gas injection means, especially where only one reducing gas composition can be injected through said means at any given time. Moreover, and while effective $NO_x$ reduction can be achieved over a relatively broad temperature range by varying the reducing gas composition, maximum reduction cannot be achieved at all operating loads when a single means is provided in a fixed location. In accordance with this invention, then, the first of these deficiencies is avoided by sectioning the injection means such that a plurality of different compositions can be injected into the effluent stream within different temperature and or flow rate ranges. The second of these deficiencies, on the other hand, is avoided by providing a plurality of injection means along the combustion effluent flow path.

For purposes of convenience and clarity, the sectioning of an injection means to facilitate the injection of different reducing gas compositions into the effluent gas stream will be referred to hereinafter as "zoning" and each of the sections within a particular injection means will be referred to as "zones". The dispositioning of a plurality of injection means along the effluent stream flow path, on the other hand, will be referred to hereinafter as "staging" and each of the means thus positioned will be referred to as a "stage".

In general, staging will be accomplished by providing a plurality of reducing agent injection means along the normal flow of the effluent combustion gas and each stage will be spaced such that at least one of said injection means will be located in said effluent combustion gas at a temperature within the range broadly specified in the aforementioned U.S. patent or within the preferred range or ranges as herein specified. In this regard, it should be noted that the number of such injection means could be tailored to a particular combustion facility by first determining the manner in which said facility is operated and thereafter installing a sufficient number of injection devices to insure that one such device will be disposed within a desired temperature range in all normal modes of operation. For example, if a boiler is normally operated at maximum load during peak hours and at one or more reduced loads at other times, two or more such injection devices (one corresponding to maximum load and one corresponding to each of the reduced loads) would generally insure maximum $NO_x$ reduction in each mode of operation. In this regard, it should be noted, however, that since the reducing agent or agents useful in the present invention may be used effectively over a relatively broad range of temperatures when temperature and reducing agent compositions are carefully coordinated, it is possible that a single injection means could be properly disposed so as to facilitate more than one mode of operation. This, then, should be considered in the tailoring of any particular combustion facility to the use of the present invention.

In addition to the temperature variation along the flow path and with respect to such tailoring operations, the variation in temperature and flow rate of the combustion effluent across any given cross-section of the flow path should also be considered. In this regard, and as suggested previously, the temperature across any cross-sectional area will vary, generally, from a maximum at or near the center and decrease radially (outwardly) therefrom. The temperature across this same cross-section will also vary with loading and to a lesser extent with other operating variables. As a result, it will generally, be necessary to establish a temperature and flow rate profile along several cross-sections of the flow path and especially along those cross-sections within which an injection means will be located in order to realize the maximum possible advantage from the method of this invention.

Figure 7:
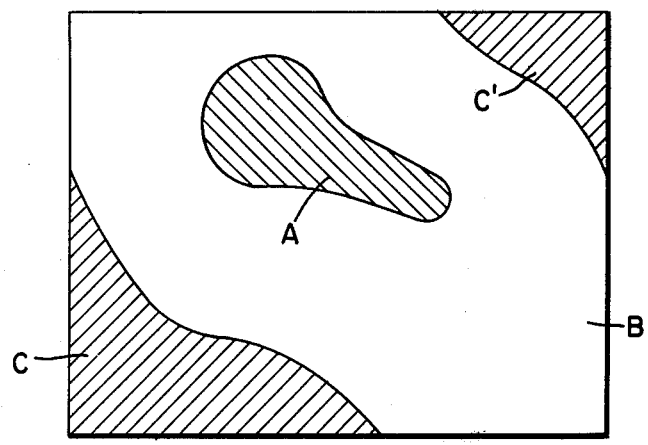
FIG. 7 is a schematic of a temperature profile illustrating the temperature variation which might be found across a given cross-sectional flow area such as 6—6 (FIG. 1) at a given loading.
Figure 8:
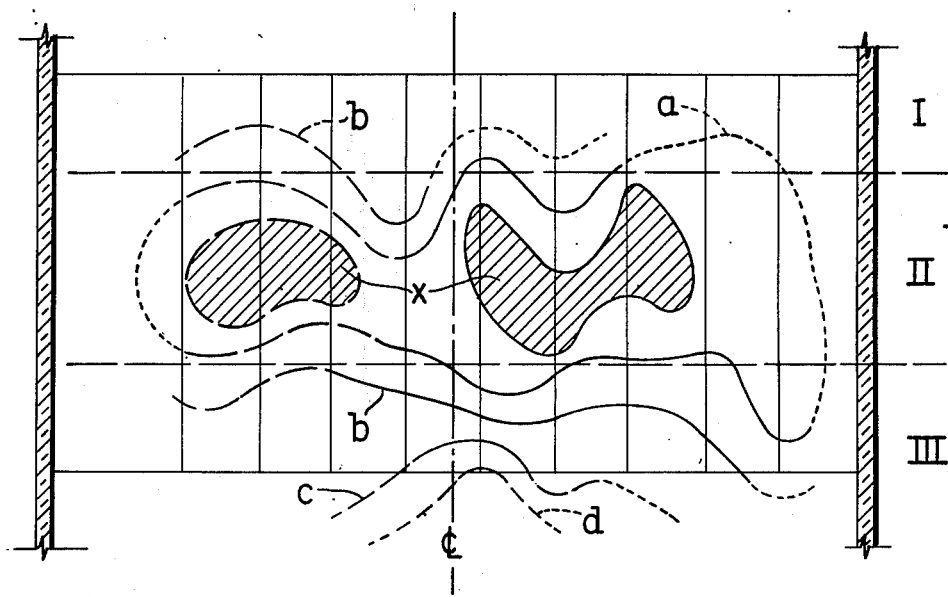
FIG. 8 is a schematic of another temperature profile illustrating another temperature variation which might be found across a cross sectional flow area of a different combustion apparatus such as 8—8 (FIG. 2)

In determining the location or locations of the injection means to be installed in a particular combustion facility it will, generally, be expedient to establish a series of temperature profiles (such as illustrated in FIGS. 7 and 8) along the combustion effluent flow path at each of the loadings normally encountered during operation. These profiles could, of course, be established in several ways. Best results are, however, generally obtained by direct measurement of the temperatures during actual operation. Once established, the profiles would then be used to determine the number of injection means required for effective $NO_x$ reduction and the positioning of each. Similarly, these temperature profiles, when coupled with suitable effluent flow rate profiles, which also are most conveniently established by direct measurement, would be used to determine the number of zones and the contour thereof.

Once the injection means are installed, any suitable method could be used to determine the temperature at or near each of the reducing gas injection means and at or near each of the zones within each such means to facilitate a determination as to which of these means and/or zones will be most effectively used for the purpose of injecting reducing gas into the combustion effluent stream. In this regard, it should be noted that each of the several injection means could be equipped with one or more temperature sensing devices and the temperature thus sensed used directly to control which of said means or zones thereof will be used or the temperature or temperatures actually sensed could be transmitted to a suitable control means which would, in turn, function to determine the optimum point or points of injection. Alternatively, any of the operating parameters which would reflect the temperature at any and/or all of the several injection means as well as the various zones within such means could be used to control the point or points at which the reducing gas is injected into the combustion facility. In this regard, it should be noted that the temperature and flow rate profiles (used to establish location and contour) could be correlated with the possible operating modes and one or more of the operating parameters which would reflect this particular mode then used to control the point or points of injection. For example, fuel flow rate to the combustion source would offer a convenient means for controlling the point or points of injection.

It will, of course, be appreciated that once the optimum point or points of injection have been determined, the optimum reducing gas composition could also be determined for injection at these points. For example, when the optimum injection means is located at a point where a substantial portion of the combustion effluent is at a temperature within the range from about 900° to about 1000° C., ammonia or an ammonia precursor could be the sole reducing gas injected into the effluent stream. If the temperature at the optimum means for injection were below 900° C., however, it would then be necessary to add hydrogen or another suitable reducing gas with the ammonia in order to affect the desired $NO_x$ reduction. In this regard, reference can be had to U.S. Pat. No. 3,900,554 or the succeeding portions of this specification to determine the relative reducing gas composition required for maximum effectiveness at any particular temperature or range of temperatures. Similarly, the flow rate profiles could be used to determine the oxidative flow rate of reducing gas through each zone.

Generally, any suitable means could be used to facilitate injection of the reducing gas into the combustion facility or the effluent gas stream therefrom. In a simplest embodiment, the injection means would comprise one or more suitably insulated or cooled tubes having one or more suitably sized apertures therein or one or more nozzles functionally attached thereto. Generally, these apertures and/or nozzles can be disposed such that the reducing gas enters the effluent combustion gas in essentially any direction including but not necessarily limited to countercurrently, cocurrently and/or radially. In a preferred, optimum, mode of operation, however, each reducing gas injection means will comprise a plurality of tubes, which tubes will be insulated, each such tube being disposed generally parallel and in the same plane as each other tube and each such tube comprising a plurality of apertures or nozzle type openings to facilitate injection of the reducing gas into the combustion effluent stream. Moreover, these openings will be spaced such that the spray pattern therefrom will slightly overlap the spray pattern from adjacent openings thereby substantially blanketing the entire cross-section of combustion effluent gas flow area. In this regard, it should be noted that this slight overlapping of adjacent spray patterns will depend upon the total amount of reducing gas, including any diluent, and the pressure differential through the aperture or opening. Optimum injection for any given reducing gas injection means will, then, depend upon the size and spacing of the injection outlets, the total volume of reducing gas, including any diluent, injected through each such outlet and the total pressure upstream the reducing gas inlets.

Generally, the volume of combustion effluent at the conditions at which the reducing gas is injected will be quite large when compared to the amount of ammonia required to effect the desired $NO_x$ reduction and, indeed, could be 10,000 times as great or even greater. As a result, it would be most difficult to effect the desired mixing and contacting of this volume of combustion effluent with this volume of ammonia without the use of a diluent. For this reason, then, the ammonia will, generally, be combined with a diluent for purposes of injection and mixing.

In general, any inert gaseous material could be used as a diluent. Suitable diluents include steam, nitrogen, helium, and the like. Steam is, however, most readily available and, indeed, has been found to offer certain distinct advantages. Generally, a sufficient amount of diluent will be used to provide from about 0.3 to 3.0 lb. moles thereof per hour per square foot of combustion effluent flow area in the cross-section subjected to treatment.

Having thus broadly described the present invention, it is believed that the same will become even more readily apparent by reference to the appended drawings. Referring, then, to FIG. 1 a process furnace modified so as to facilitate the reduction of nitrogen oxides emissions to the atmosphere in a manner consistent with the present invention is illustrated. The furnace 101 comprises a housing 102 at least one burner 103 located in the combustion section 104, a radiant section 105, a convection section 106 and a flue stack 107. The furnace as illustrated also comprises a single reducing gas injection means 108. In this regard, it should be noted, however, that while only one such injection means has been illustrated any numbers of such means consistent with the manner in which the furnace is generally operated could be used.

In operation, combustion is effected with one or more burners by combining fuel and oxygen in a manner well known in the prior art and not illustrated in the figure. The combustion gases from the burner or burners then combine and pass generally upwardly, through the radiant section 105 past reducing gas injection means 108, through the convection section 106 and thence to the flue stack 107. Once the gases are in the flue stack, the same may be treated to remove other pollutants as well as other undesirable products or the same may be emitted directly to the atmosphere.

Generally, each of the reducing gas injection means used in the method of this invention will be disposed as closely to perpendicular to the path of the combustion effluent flow as is possible and each will extend across the entire flow area. Such disposition is not, however, necessary and, indeed, might be impossible in some furnaces and boilers, especially when the injection means is located at a point where the direction of the combustion effluent flow path is changing. Moreover, in those embodiments where only a portion of the effluent gas stream is to be treated, it would not be necessary for the injection means to extend across the entire flow area. Notwithstanding this, however, maximum operating flexibility will be achieved when each injection means extend across the entire flow area and when each of the means is divided into one or more zones so as to permit the injection of different reducing gases or compositions within each of said zones (corresponding to different temperature ranges across the flow area); the injection of reducing gas at different rates (corresponding to different effluent flow rates across the flow area) and/or to permit the use of so many zones as may be necessary to effect the desired reduction in $NO_x$ emissions. In this regard, it will be appreciated that when a means is disposed at an angle other than perpendicular, both staging and zoning will be achieved therewith.

In the embodiment illustrated, and any time that a single injection means is used, the injection means 108 will be sectioned or zoned such that at least two different reducing gas compositions can be injected into the combustion effluent stream. For example, a relatively simple, three-zone injection means such as that illustrated in FIG. 5 could be used to effect substantial $NO_x$ reduction or a more complicated, contoured injection means such as that illustrated in FIG. 6 could be used to achieve maximum or optimum $NO_x$ reduction.

In any case, when the nitrogen oxide reduction method of the present invention is in operation, suitable means, not illustrated, will be used to determine the temperature in the immediate vicinity of each of the respective zones and one or more of the zones disposed within the combustion effluent gas stream at a temperature within the range from about 700° to about 1000° C. and preferably 900° to 1000° C. used as the means for effecting ammonia injection or the injection of ammonia plus one or more reducing agents in combination therewith. In this regard, it should be noted that when the single injection means is properly positioned in the combustion effluent flow path a substantial portion of the effluent in the immediate vicinity of said means will be at a temperature within the range from about 700° to about 1000° C. and therefore subject to treatment in accordance with this invention.

In the embodiment illustrated, the temperature profile in the plane cut by line 6—6 will appear, generally, as shown in FIG. 7 with the actual temperature of the effluent within each of the designated areas varying with loading. For example, the temperature of the effluent within the area designated A might be above 1000° C. when the furnace is operated at maximum load while the temperature within the area designated B might range from 900° to 1000° C. with the temperature in the areas designated C and C' below 900° C. In this case, best results would be obtained with an injection means contoured such that no reducing gas would be injected into the area designated A while ammonia alone or ammonia plus a relatively low amount of a second reducing gas would be injected into the area designated B and ammonia plus a second reducing gas, generally at a higher concentration than used in area A, would be injected into the areas designated C and C'. At a lower loading, on the other hand, the temperature of the effluent within the area designated A might be between 900° and 1000° C., the temperature within the area designated B between 700° and 900° C. and the temperature in the areas designated C and C' below 700° C. In this case, a reducing gas composition considered most effective at a higher temperature would be injected into area A while a different composition, generally more effective at lower temperatures would be injected into area B. Since, in this mode of operation, the temperature of the effluent in areas C and C' is below that at which $NO_x$ can be effectively reduced in accordance with the invention, no gas would be injected into these areas.

It will, of course, be appreciated that the temperature profile used in the preceding illustration could be unique and characteristic of only one furnace or furnace type. Also, the temperatures actually quoted are for purposes of illustration only. Nonetheless, a similar temperature profile could be determined for any combustion facility at or near each injection means installed therein and used to establish the most effective gas composition to be used in each zone of said injection means. It will also be appreciated that, in first case illustrated i.e., where the temperature in area A was above the maximum temperature for effective $NO_x$ reduction in accordance with this invention, $NO_x$ reduction in this portion of the gas stream could be accomplished through the use of a second injection means located downstream of the one illustrated in FIG. 1 and at a point where the temperature of the effluent generally in the area designated A is below 1000° but above 700° C. Similarly, in the second case illustrated; i.e. where the temperature of the effluent in areas C and C' is below 700° C., $NO_x$ reduction in the effluent passing generally through these areas could be accomplished with an injection means located upstream of the one illustrated in FIG. 1 and at a point where the effluent in these areas is at a temperature above about 700° but below about 1000° C.

Figure 6:
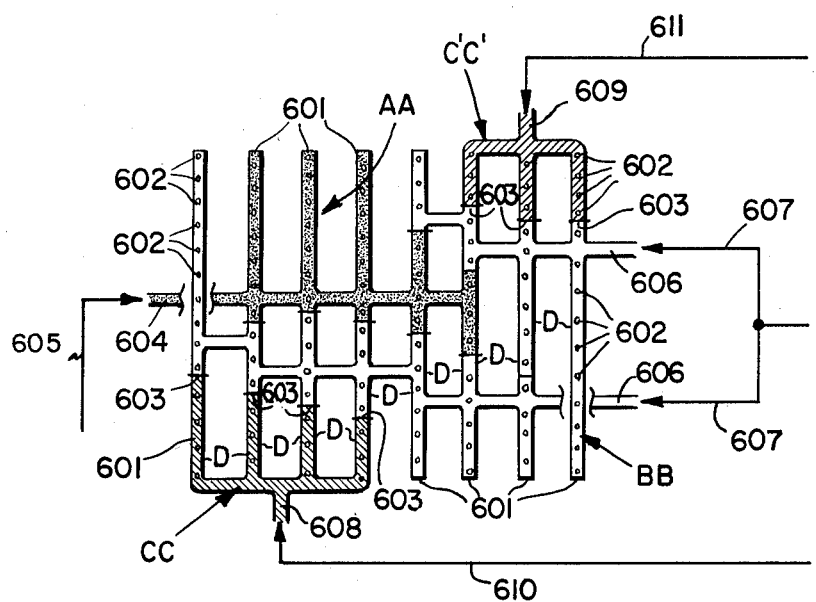
FIG. 6 is a plan view, with certain detail omitted for purposes of clarity, of a preferred injection means useful in the present invention.

Also, in the embodiment illustrated and as suggested previously, any suitable means could be used to effect the desired reducing gas injection into the effluent gas stream and, as illustrated, such a means will comprise a plurality of injection inlets such as appertures 109—109 which are sized and positioned so as to provide an overlapping spray pattern 110. As also previously indicated, however, best results will be achieved when the injection means is sectioned so as to provide a plurality of zones with each zone contoured so as to correspond substantially with a particular temperature range. Such an injection means is illustrated in FIG. 6. Referring, then, to FIG. 6, the injection means comprises a plurality of tubes 601—601 disposed generally parallel with respect to each other and separated, one from the other, by a distance D. Each of the tubes, in turn, comprise a plurality of apertures 602—602, which apertures would, generally, also be separated by a distance D along the tube.

In the embodiment illustrated, the tubes are provided with plugs 603—603, or other suitable means to provide the desired zone configuration and each zone is provided with a separate supply manifold. In the embodiment illustrated, then, the heavily shaded zone AA corresponds substantially to the higher temperature area A illustrated in FIG. 7 and is supplied with a desired reducing gas composition through manifold 604 and supply line 605. The unshaded zone BB on the other hand, is intended to correspond substantially to area designated B in FIG. 7 and is supplied with a suitable reducing gas composition through manifolds 606—606 and supply lines 607—607. Finally, the lightly shaded zones CC and C'C' are intended to correspond substantially to areas C and C', respectively, as illustrated in FIG. 7 and, when used, these zones would be supplied with reducing gas through manifolds 608 and 609 and supply lines 610 and 611, respectively.

Figure 2:
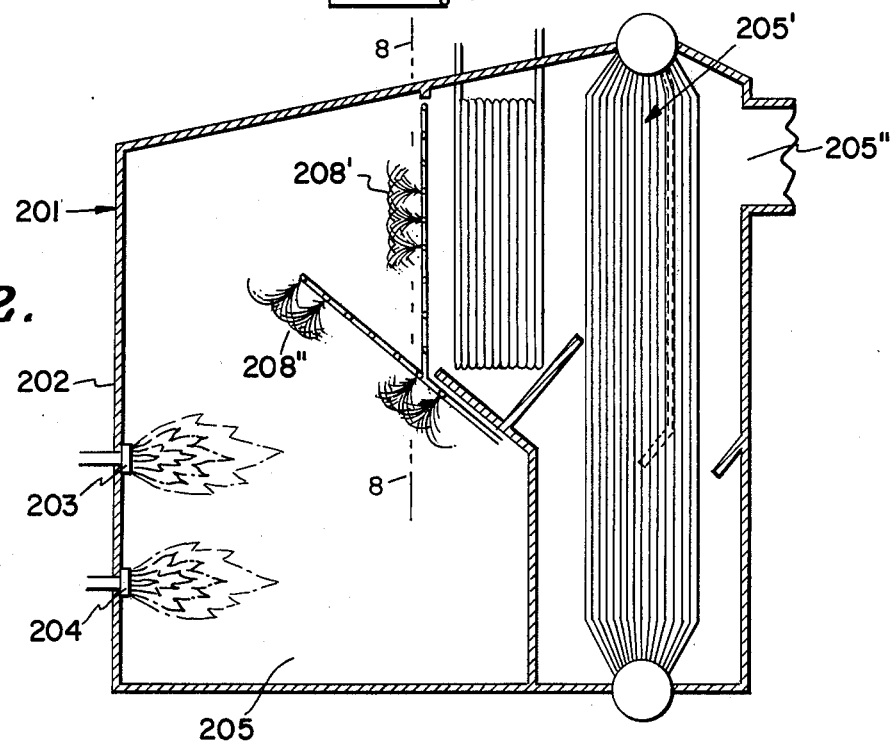
FIG. 2 is a cross-sectional view of a boiler, with certain detail omitted for purposes of clarity, illustrating the modifications required to effect the injection flexibility sought in the present invention.
Figure 3:
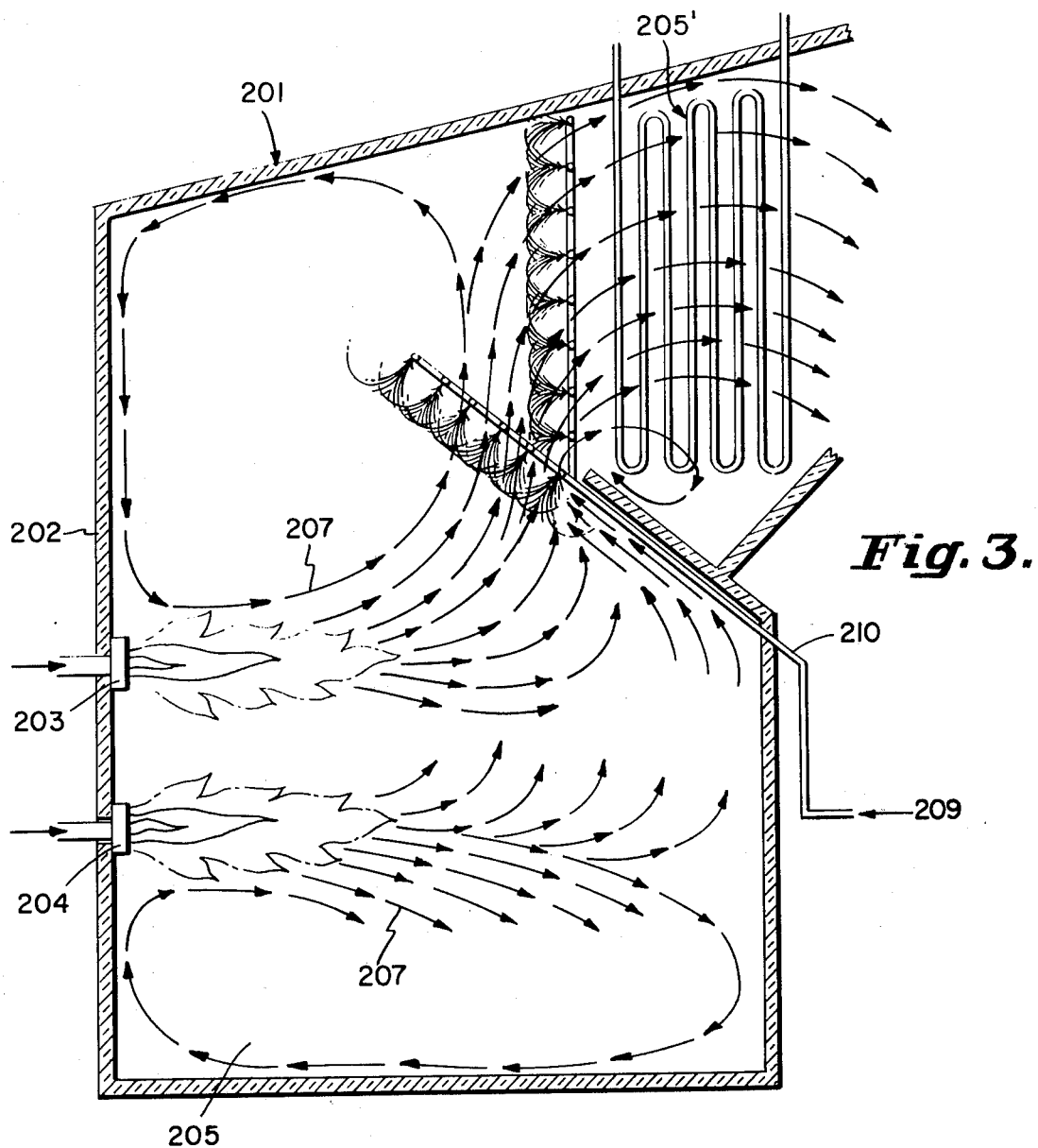
FIG. 3 is an enlarged elevation of the firebox portion of the boiler illustrated in FIG. 2 with arrows illustrating the flow path of the combustion effluent gas stream.
Figure 9:
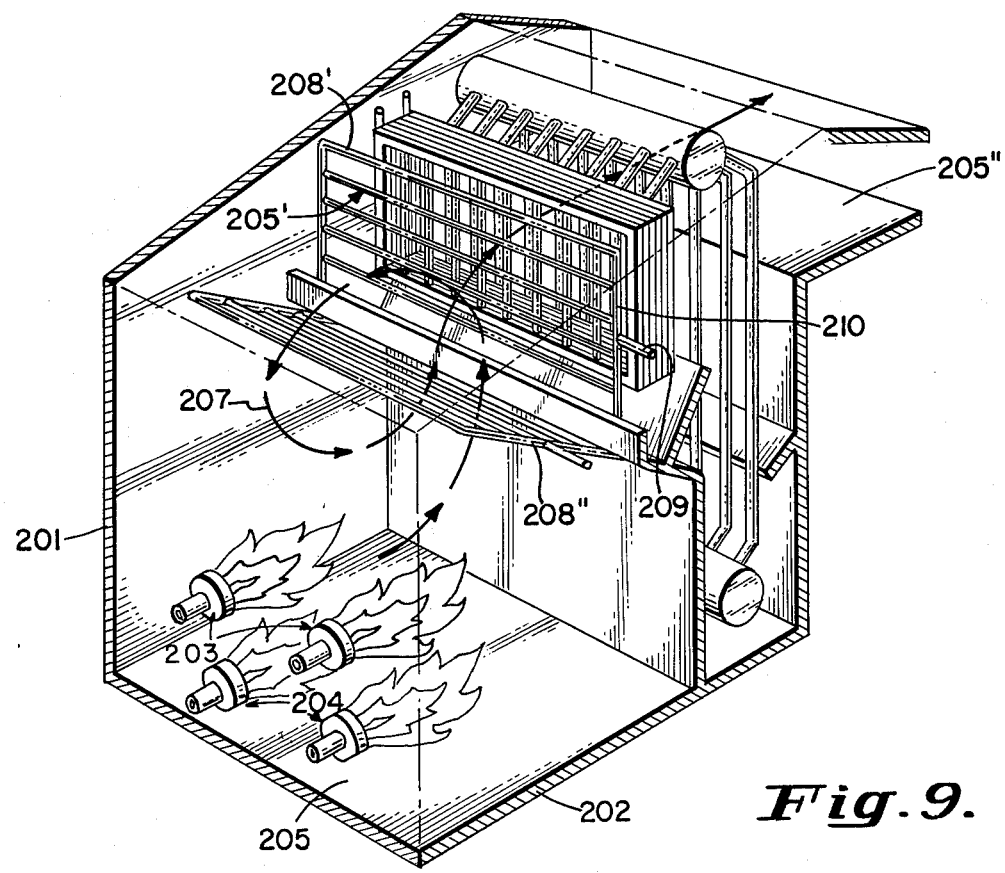
FIG. 9 is an isometric view of a boiler, with certain detail omitted for purposes of clarity, further illustrating an embodiment of this invention.

Referring now to FIGS. 2, 3 and 9, a boiler modified so as to facilitate the use of the improved nitrogen oxide reduction method of the present invention is illustrated. The boiler 201, like the furnace comprises a suitable housing 202, a plurality of burners 203 and 204 (only two such burner being illustrated in each of two rows), a firebox 205, an energy recovery section 205' and a flue gas outlet 205". As is readily apparent from the Figures, however, and particularly FIG. 3, the general flow path of the combustion effluent, which is illustrated by arrows 207—207 is much different in a boiler than in a process furnace. As a result, the positioning of the reducing gas injection means is much more difficult to accomplish, at least, such that the same will cover substantially the entire cross-section of the flow area and be substantially perpendicular thereto when the same is being used as the reducing gas inlet for a particular mode of operation. Nonetheless, a significant improvement in nitrogen oxide reduction can be accomplished through the use of a plurality of such injection means, especially when these means are positioned such that the same are, generally, disposed in the combustion effluent stream within the desired temperature range when the same are in use.

In the embodiment illustrated, two such means, 208' and 208", are shown. Additional such means could, however, be used and, indeed, would be used when the boiler is particularly large, subject to several operating variations and when a significant temperature drop is realized across the flow path.

In operation, combustion is effected by mixing a suitable fuel with oxygen in one or more of the plurality of burners 203—203 and 204—204. The combustion effluent gases from the burners are then combined and flow generally upwardly along a path such as that illustrated by arrow 207—207 past the reducing gas injection means 208' and 208" and into the energy recovery section 205'. The combustion effluent gases then leave the boiler through line 205" and the same may be treated to remove other pollutants or other undesirable components or the same may be vented directly to the atmosphere.

Generally, each of the plurality of reducing gas injection means will be disposed such that each extends substantially completely across the cross-section of the flow path. Moreover, and as in the case of other combustion facilities, the reducing gas injection means which is positioned farthest downstream from the point or points of combustion will be positioned such that the same will be disposed in the combustion effluent stream at a point where at least a portion of said stream is at a temperature within the range of from about 900° to about 1000° C. when the boiler is operated at its normal maximum loading. In this regard, it should be noted that positioning within the convection section, as illustrated in FIG. 10, with reference numerals identical to those used in FIGS. 2, 3 and 10, may be required with some boilers and that it may be necessary to reposition one or more of the heat exchangers in the energy recovery section so as to permit disposition within the desired temperature range and at the same time provide sufficient volume to permit the desired contacting and nitrogen oxide reduction. Such relocation of the heat exchange equipment is, however, believed to be well within the ordinary skill of the art and the same forms no part of the present invention.

In the embodiment illustrated in FIGS. 2, 3 and 9, reducing gas injection means 208' (208" in FIG. 10) is intended to be disposed such that same lies in the combustion effluent stream at a point where at least a portion of said stream is at a temperature within the range from about 900° to 1000° C. when boiler is operated at maximum loading while reducing gas injection means 208" is intended to be disposed in the effluent gas stream at a point where at least a portion of said stream is at a temperature within the range from about 900° to 1000° C. when the loading is reduced sufficiently to drop the temperature in the immediate vicinity of reducing gas injection means 208' below about 900° C. It will, of course, be appreciated that additional injection means could be provided and with a plurality of such reducing gas injection means disposed in this manner; i.e. to compensate for further reductions in operating load, it would be possible to have at least one such means disposed in the combustion effluent stream within the preferred temperature range during all possible modes of operation.

During operation, and when the improved nitrogen oxide reduction method of the present invention is being used, the temperature in the immediate vicinity of each of the reducing gas injection means and/or the respective zones thereof will be determined and ammonia, either alone or in combination with one or more other reducing gases and suitably diluted, will be injected into the effluent gas stream through the reducing gas injection means or zones which are disposed within the desired temperature range. For example, and when the boiler is being operated at its maximum normal capacity, ammonia plus a suitable diluent will be fed through line 209 and combined with any other reducing agent that might be used in manifold 210 and then introduced into the reducing gas injection means 208'. When the boiler load is reduced sufficiently to drop the temperature in the immediate vicinity of reducing gas injection means 208' below about 900° C. or when the boiler operation is otherwise altered such that one of the other reducing gas inlet means is disposed in the effluent gas stream within a more preferred temperature range, the ammonia injection will be discontinued through reducing gas injection means 208' and started to the more desirably disposed injection means. For example, the first reduction in operating load would generally result in a shift of ammonia flow from injection means 208' to injection means 208". In this case, ammonia plus a suitable diluent would be mixed with any other reducing gas that might be used in manifold 210 and fed to the reducing gas injection means 208" through a suitable arrangement of valves and/or lines not illustrated in the Figures. Continued reduction or further alteration in operating mode, could, then, result in a shift of ammonia flow from injection means 208" to still another injection means (also not illustrated). Still further reduction in boiler load or some other modification could result in further shifting either to still another reducing gas injection means not illustrated or back to one or more of the reducing gas injection means illustrated such as 208' or 208". In this regard, it should be noted that it is, generally, within the ordinary skill of the art to devise suitable detecting equipment and to effect the desired shift or change in the point of ammonia injection as the result of a detected change.

While the foregoing embodiments have been described by reference to ammonia injection at a single point, it will be appreciated that in some modes of operation, at least, it could be desirable to inject ammonia through more than one of the reducing gas injection means. Moreover, while ammonia alone is generally effective only within the temperature range from about 900° to about 1000° C., and since other reducing gases could broaden this range of effectiveness, it is well within the scope of this invention to inject ammonia to one or more of the reducing gas injection means which are disposed in the combustion effluent stream within the critical temperature range and to inject hydrogen or another suitable reducing gas through a different reducing gas injection means which means might be disposed in the combustion effluent stream at a temperature within the range from about 700 to about 900° F. In this way, the hydrogen or other reducing gas would combine with unconverted ammonia from an upstream injection means to continue the desired nitrogen oxide reducing even within this lower but broader temperature range.

Figure 4:
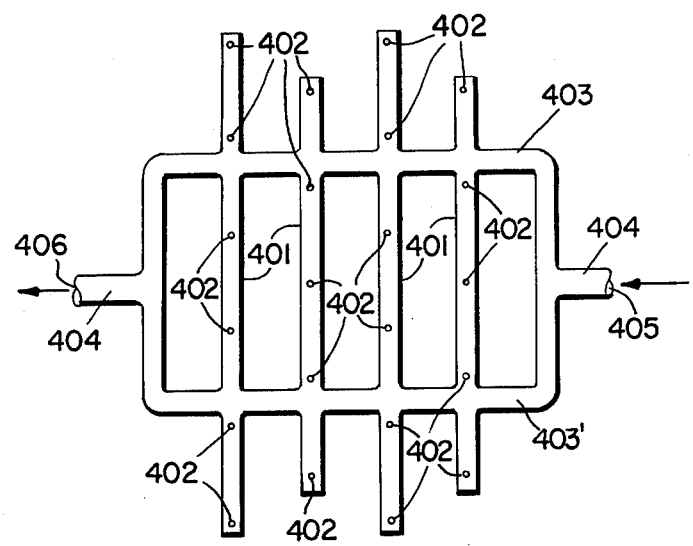
FIG. 4 is a plan view, with certain detail omitted for purposes of clarity, of an injection means useful in the present invention.

In general, and as indicated previously, any suitable means could be used to effect the desired injection of reducing gas. For example, and as illustrated in FIG. 4, each of the injection means could comprise a plurality of tubular injectors 401—401. These injectors would again generally be disposed parallel with respect to each other and their respective centers would, generally, lie in the same plane. Also, each of the injectors 401—401 would comprise a plurality of apertures 402—402 which apertures would be suitably sized and positioned so as to effect the desired overlapping of the spray or injection pattern. In general, any suitable means such as opposed manifolds 403 and 403' could be used to interconnect the respective tubular injectors. The manifolds, in turn, could be supplied in suitable fashion such as a flow-through supply line 404—404.

When the injector illustrated in FIG. 4 is in use, a suitable reducing gas composition will be introduced through inlet 405 and any excess withdrawn through outlet 406. Also, when this type of injection means is used, the flow rate through the opposed supply manifolds 403 and 403' can be controlled so as to provide adequate cooling to prevent undesirable dissociation of the ammonia. Alternatively, the inlet, the supply manifold or manifolds and the tubular injectors could be water cooled or insulated for the same purpose.

Figure 5:
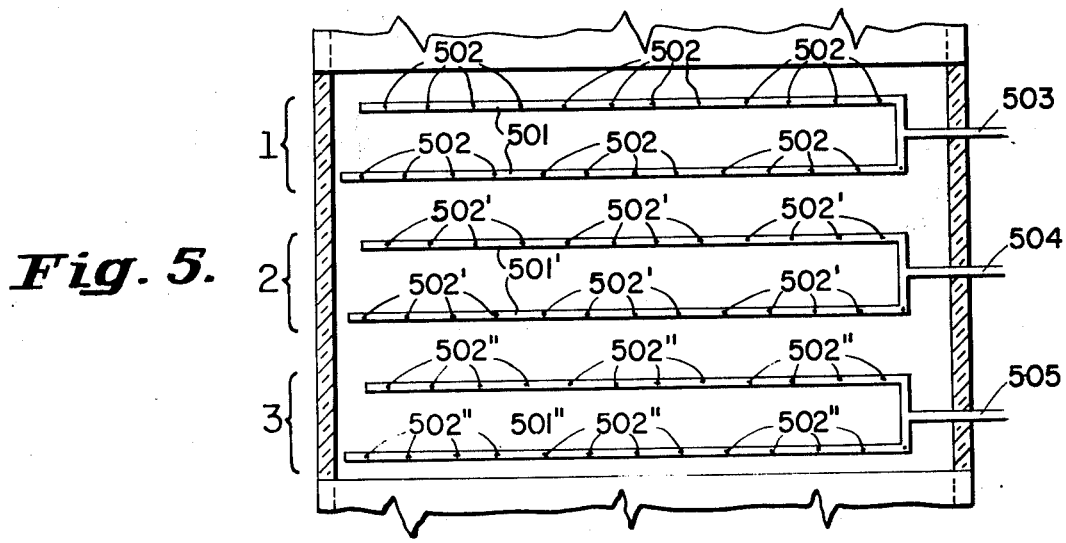
FIG. 5 is a plan view, with certain detail omitted for purposes of clarity, of another injection means useful in the present invention.

In an alternate embodiment, one or more of the injection means could be divided into zones in a manner illustrated in FIG. 5. In this embodiment, the injection means would again comprise a plurality of tubular injectors 501—501, 501'—501' and 501"—501". Each of the tubular injectors will also comprise a plurality of apertures 502—502, 502'—502' and 502"—502", respectively, which apertures would be sized and positioned so as to provide an overlapping spray pattern. Moreover, each of the tubular injectors will, generally, be disposed parallel, with respect to one another, and the centers of each will lie, generally, in the same plane.

In the embodiment illustrated, the injection means comprises three zones and each of these zones is provided with a separate supply or feed line so that each could be used to inject a different reducing gas composition. The first zone, which comprises tubular injectors 501—501, is, then, supplied through line 503. The second zone, on the other hand, which comprises tubular injectors 501'—501' is supplied through line 504, and the third zone, which comprises tubular injectors 501"—501" is supplied through line 505.

Ideally and as indicated previously, when a zoned injection means is used, each of the zones will be disposed such that each corresponds generally to a different temperature gradient across the flow path so that a reducing gas composition tailored to the particular corresponding gradient can be injected therewith. The zoned injection means illustrated in FIG. 5 would, then, be particularly effective when disposed across a cross-section of an effluent flow path having a temperature profile such as that illustrated in FIG. 8. In this case, one reducing gas composition or rate could be injected into that portion of the flow path designated as I in FIG. 8 using zone 1 (tubular injector 501—501) while a second composition or rate could be injected into that portion of flow path designated as II using zone 2 (tubular injectors 501'—501') and a third composition or rate could be injected into that portion designated as III in FIG. 8 using zone 3 (tubular injectors 501"—501") of the injection means illustrated in FIG. 5.

Alternatively, and as illustrated in FIGS. 2 and 3, zone 2 of injection means 208' could be used to inject a reducing gas into the hotter, central portion of the effluent gas stream while zones 1 and 3 are used to inject a reducing gas into the outer, cooler portions of the effluent gas stream. In this regard, it should be noted that the heavily shaded areas designated x in FIG. 8 could represent the hottest portion of the effluent gas stream while lines a, b—b, c and d represent constant and respectively lower temperatures. In a most preferred embodiment, then, the injection means would be sectioned such that the same comprised a plurality of zones contoured so as to correspond to those areas reflected on the temperature profile by the constant temperature lines and the areas designated x. In this regard, and while maximum advantage would be obtained when an infinite number of zones were provided, it should be noted that two zones corresponding to those areas in which the temperature is between 900° and 1000° C. and 700° to 900° C. will provide significant improvement over an injection means comprising a single zone across the entire temperature ranges.

PREFERRED EMBODIMENT

In a preferred embodiment of the present invention the improved nitrogen oxide reduction method will be used to reduce nitrogen oxide emissions to the atmosphere from stationary sources such as process furnaces and power plant boilers and each reducing gas injection means actually used will be zoned such that a reducing gas of one composition can be injected into that portion of the effluent at a temperature between about 900° and about 1000° C. and a reducing gas of a different composition injected into that portion of the effluent at a temperature between about 700° and about 900° C. Moreover, each injection means actually used will be further sectioned or zoned such that any significant injection of reducing gas into that portion of the effluent at a temperature above about 1000° C. and that portion below about 700° C. can be avoided. This could, of course, be accomplished with a single reducing gas injection means which is sectioned into two or more zones depending upon the temperature profile across the plane in which the reducing gas is injected. The use of two or more such injection means will, however, generally provide maximum flexibility.

In a most preferred embodiment of the present invention, each of the injection means will be sectioned such that each zone is contoured to correspond substantially with a constant temperature line reflected on a temperature profile in a manner illustrated in FIG. 6. Referring then again to FIG. 6, a particularly preferred injection means comprises a plurality of tubular injectors 601—601 which are disposed generally parallel with respect to each other. Each of the tubular injectors comprises a plurality of apertures or nozzle injection means 602—602 and in the most preferred embodiment each of these apertures or nozzles will be disposed such that the reducing gas injected therethrough will enter the combustion effluent gas stream in a direction generally countercurrent thereto. Moreover, each of the adjacent apertures along each tubular injector will be separated (center to center) by the same distance as is between the tubular injectors. Also, the apertures along any two adjacent tubular injectors will be positioned such that each lies at a point midway between the closest apertures of the next adjacent tubular injector. Also in the most preferred embodiment, the apertures and nozzles will be sized and spaced so as to provide a slightly overlapping spray pattern which substantially covers the entire cross-sectional area of the combustion effluent stream along the plane of injection.

As also illustrated in FIG. 6, the most preferred reducing gas injection means is divided into a plurality of zones (AA, BB, CC and C'C'). As thus illustrated, four zones have been shown. It will, however, be appreciated that any number of such zones could be employed while each such zone could correspond to a particular temperature range within which either a different reducing gas or a different reducing gas mixture might be injected. For purposes of contrast, zone BB, which comprises a portion of each of the tubular injectors, has been illustrated without shading. Zones CC and C'C', on the other hand, which constitutes diagonally opposed corners, have been illustrated slightly shaded and zone AA, which constitutes a portion of the central tubular injectors, is heavily shaded.

In general, each of the separate sections or zones of the reducing gas injection means will be supplied through a separate manifold. In the embodiment illustrated, then, zone AA is supplied through manifolds 604, while zone BB is supplied through manifolds 606—606 and zones CC and C'C' are supplied through manifold 608 and 609 respectively. Each of these manifolds are, in turn, supplied with a primary reducing agent, a secondary reducing agent, when used, and a carrier through corresponding feed lines.

As indicated previously, the temperature and flow rate across any given cross-section of the combustion effluent flow path will vary. A representative temperature gradient with which the injection means illustrated in FIG. 6 corresponds is illustrated in FIG. 7. As can be seen in FIG. 7, then, the central portion, which is heavily shaded could be at a temperature within the range from about 900° to about 1000° C. The unshaded portion, on the other hand, could be at temperatures within the range from about 700° to about 900° C. and, finally, the lightly shaded portions could be at temperatures below about 700° C. That portion of the gas which is at a temperature between about 900° and about 1000° C., then, would be at a temperature within the most preferred range for application of the present invention. The portion between about 700° and about 900° C., on the other hand, would be at temperatures in the lower portion of the broad temperature range within which the process of the present invention is operable, while that portion which is at a temperature below about 700° C. would be at a temperature below that generally effective. As indicated more fully hereinafter then, and particularly in the Examples each of these ranges is most effectively treated with a different reducing gas composition.

It will, of course, be appreciated that the temperature gradient shown in FIG. 7 is merely representative and, indeed, would vary from elevation to elevation along the effluent gas flow path and with operation. Notwithstanding this, however, gradients along the entire path could be established and such gradients could be established for all modes of operation. Optimum locations for one or more reducing gas injection means could, then, be determined for any combustion facility and the injection means zoned such that a different reducing gas composition could be injected into any one or more of the meaningful temperature ranges thus established. Moreover, where a portion of the gas stream is at a temperature above about 1000° C. the reducing gas injection means could be tailored such that no gas would be injected into this high temperature area. Similarly, the injection means could be tailored so that no gas would be injected into that portion of the gas stream at temperatures below about 700° C.

Such tailoring is, then, illustrated with the injection means shown in FIG. 6. As illustrated, section or zone BB is intended to correspond substantially to that portion of the flow path in which the combustion effluent is at a temperature within the range from about 700° C. to about 900° C. Sections CC and C'C', on the other hand, are intended to correspond to that portion of the flow path in which the gases are at a temperature below about 700° C. and Section AA is intended to correspond to that portion of the flow path in which the combustion effluent is at a temperature within the range from about 900° to about 1000° C. As thus sectioned, then, the combustion effluent contacted with a reducing gas injected through zone BB would be at a temperature most suitable for the use of ammonia in combination with hydrogen. Gases contacted with reducing gas injected through zone AA, on the other hand, would be at a temperature wherein the process is effective with ammonia alone while gases subject to treatment with reducing agent injected through sections CC and C'C' would be at temperature below that at which satisfactory reduction will, generally, be accomplished. This latter portion of the combustion effluent would, then, be most effectively treated with an injection means disposed nearer the point of combustion, where the temperature would be higher and such staging is clearly contemplated in the present invention.

As will be readily apparent, then, the composition of gas injected into each of these areas could be varied and the optimum concentration for each could be easily established. In this regard, it should be noted that while a given temperature profile could be quite correct at the point of addition or injection of the reducing gas, the temperature of the combustion effluent will continue to drop as the effluent stream passes the plane illustrated and, indeed, depending upon several factors could drop sharply as the gas passes this plane and before the nitrogen oxide reduction reaction is completed. For this reason, then, the gas composition actually introduced through any particular zone or section could be varied so as to allow for this further change.

During operation, ammonia or a mixture of ammonia and hydrogen will be injected into the combustion effluent gas stream through one or more of the reducing gas injection means or one or more zones thereof which is disposed in the combustion gas effluent stream where the temperature is within the range from about 900° to about 1000° C. or, when none of said reducing gas injection means or any zones thereof is disposed in the combustion effluent gas within this temperature range, an ammonia-hydrogen mixture will be injected through that means or one or more zones thereof disposed in the combustion effluent stream at a temperature closest to the preferred temperature range and at a temperature within the range from about 700° to about 900° C. The exact means used for such injection will be determined by first measuring the temperature at one or more points in the immediate vicinity of each of said injection means, comparing the temperatures thus measured and then electing the injection means or zones thereof most closely satisfying the preferred operating conditions.

The invention will become even more apparent from the following example.

EXAMPLE

In this example, a series of runs were completed in a boiler rated at 50 horsepower to determine the hydrogen to ammonia ratio required for optimum $NO_x$ reduction at various points along the combustion effluent flow path. In each run, the boiler was operated at 50 percent of its rated capacity with a single burner. The data were obtained by first positioning the injection means at a fixed distance from the burner and then determining the $NO_x$ concentration in the effluent, at a point downstream from the point of treatment at different hydrogen/ammonia ratios. The injection means was then repositioned and a corresponding set of data points determined at the new location. In all, data was obtained at six locations; viz., with the injector disposed in the effluent path at 5, 6, 7, 8, 9 and 10 feet from the burner, and six hydrogen/ammonia ratios; viz. at hydrogen to ammonia ratios of 0, 0.79, 1.44, 3.15, 4.2 and 7.28. In each of the runs completed in this series an injection means similar to that illustrated in FIG. 4 was used and the $NH_3/NO$ molar ratio was maintained at 1.7. For convenience, the results obtained have been plotted in FIG. 11.

Figure 11:
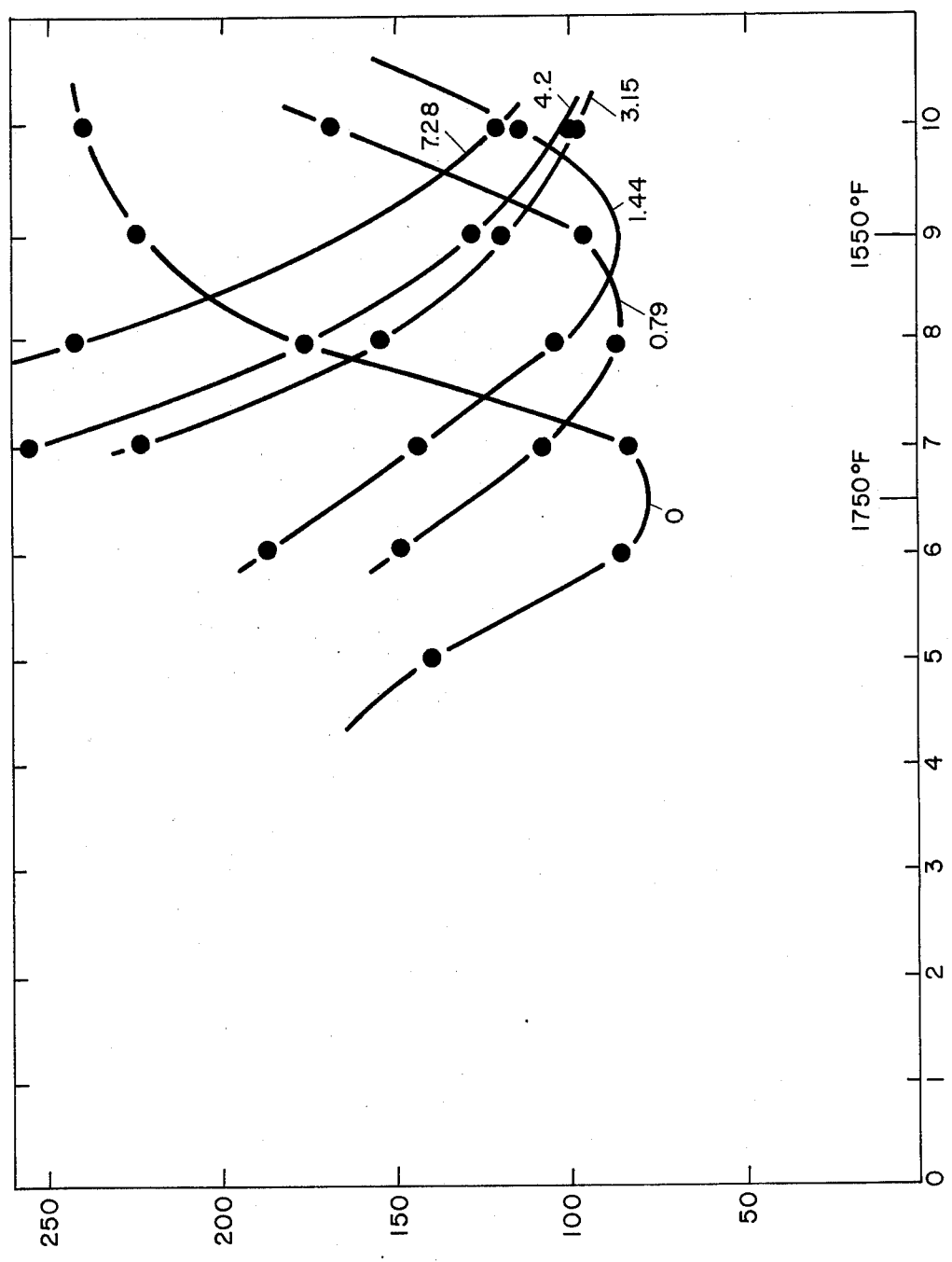
FIG. 11 is a plot of the results obtained in the Example.

Referring then to FIG. 11, the $NO_x$ content in the combination effluent gas, after treatment, is plotted as a function of the distance of the injection means from the burner location for each hydrogen/ammonia ratio. As can be seen in the Figure, at the conditions actually used, ammonia alone was most effective when the injection means was positioned about 6.5 feet from the burner and where the average temperature across the flow path was about 1750° F. Maximum effectiveness with increasing $H_2/NH_3$ ratios, on the other hand, was realized at progressively greater distances from the burner and at correspondingly lower temperatures. For example, an $H_2/NH_3$ ratio of 1.44 was most effective at about 9 feet from the burner where the average temperature was about 1550° F.

From the foregoing, then, it should be readily apparent that most effective operation will be achieved when the injection means is ideally positioned and when the ratio of $H_2/NH_3$ is tailored to the temperature in the immediate vicinity of the injection. Such location could, in practice, be realized through the use of a plurality of injection means. As should also be readily apparent, improved results will be realized when any particular injection means is zoned such that different $H_2/NH_3$ ratios can be used across the entire cross section of flow area.

What is claimed is:

1. In a combustion process wherein a reducing gas comprising ammonia, either alone or in combination with one or more additional reducing gases is injected into a flowing combustion effluent containing NO and oxygen when at least a portion of said combustion effluent is at a temperature within the range of from about 700° to about 1000° C. to reduce the NO concentration therein, the improvement which comprises placing an injection means having a plurality of spaced apertures or nozzles at a location within the path of said flowing combustion gases and generally perpendicular to the path of said flowing combustion gases, at least a portion of said gases flowing across said injection means being at a temperature in the range of from 700° to 900° C. and at least a portion of said gases flowing across said injection means being at a temperature in the range of from 900° to 1000° C., and injecting a first gas mixture comprising ammonia and an inert diluent and wherein the said ammonia is the sole reducing gas contained therein through one or more of said apertures or nozzles into said combustion gases that are at a temperature in the range of from 900° to 1000° C. and injecting a second gas mixture comprising ammonia, an additional reducing gas and an inert diluent through one or more of said apertures or nozzles into said combustion gases that are at a temperature in the range of from 700° to 900° C.

2. The process of claim 1 wherein said additional reducing gas in said second gas mixture is hydrogen.

3. The process of claim 1 wherein said diluent in said first and second gas mixtures is steam.

4. The process of claim 2 wherein said diluent in said first and second gas mixture is steam.

* * * * *